(12) United States Patent
Kitano et al.

(10) Patent No.: US 11,910,817 B2
(45) Date of Patent: Feb. 27, 2024

(54) METHOD FOR PRODUCING INSTANT NOODLES

(71) Applicant: NISSIN FOODS HOLDINGS CO., LTD., Osaka (JP)

(72) Inventors: Sho Kitano, Osaka (JP); Norikazu Asao, Osaka (JP); Hiroyuki Kono, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 162 days.

(21) Appl. No.: 17/406,798

(22) Filed: Aug. 19, 2021

(65) Prior Publication Data

US 2021/0378272 A1 Dec. 9, 2021

Related U.S. Application Data

(62) Division of application No. 16/639,998, filed as application No. PCT/JP2018/044567 on Dec. 4, 2018, now abandoned.

(30) Foreign Application Priority Data

Dec. 13, 2017 (JP) ................. 2017-238519
Dec. 13, 2017 (JP) ................. 2017-238520
Dec. 25, 2017 (JP) ................. 2017-247484

(51) Int. Cl.
*A23L 7/113* (2016.01)
*A23L 29/00* (2016.01)
*A23L 33/26* (2016.01)

(52) U.S. Cl.
CPC ............. *A23L 7/113* (2016.08); *A23L 29/015* (2016.08); *A23L 29/035* (2016.08); *A23L 33/26* (2016.08)

(58) Field of Classification Search
CPC ........ A23L 7/113; A23L 29/015; A23L 7/109; A23L 29/294; A23L 27/40
See application file for complete search history.

(56) References Cited

U.S. PATENT DOCUMENTS

| | | | |
|---|---|---|---|
| 4,473,595 A | 9/1984 | Rood et al. | |
| 4,963,387 A | 10/1990 | Nakagawa et al. | |
| 6,136,349 A | 10/2000 | Karppanen et al. | |
| 2004/0126469 A1 | 7/2004 | Tomoda et al. | |
| 2008/0260921 A1 | 10/2008 | Imanishi et al. | |
| 2009/0047396 A1 | 2/2009 | Ikeda | |
| 2009/0196957 A1 | 8/2009 | Vadlamani et al. | |
| 2010/0047398 A1 | 2/2010 | Vasquez | |
| 2011/0151094 A1 | 6/2011 | Foo et al. | |
| 2011/0229613 A1 | 9/2011 | Takizawa et al. | |
| 2012/0003376 A1 | 1/2012 | Alam | |
| 2012/0201945 A1 | 8/2012 | Iwahata et al. | |
| 2014/0127377 A1 | 5/2014 | Ishihama | |
| 2014/0377381 A1* | 12/2014 | Brennan ............. A61P 43/00 426/534 |
| 2015/0125589 A1* | 5/2015 | Tsuchiya ............. A23L 27/10 554/80 |
| 2015/0296845 A1 | 10/2015 | Asahina et al. | |
| 2020/0093160 A1 | 3/2020 | Abe et al. | |

FOREIGN PATENT DOCUMENTS

| | | |
|---|---|---|
| CN | 102548429 | 7/2012 |
| CN | 107114753 | 9/2017 |
| EP | 3508071 | 7/2019 |
| JP | S60-502038 | 11/1985 |
| JP | S63-017668 | 1/1988 |
| JP | S63-157949 | 6/1988 |
| JP | S64-027447 | 1/1989 |
| JP | H01-047358 | 2/1989 |
| JP | H09-051775 | 2/1997 |
| JP | H11-032712 | 2/1999 |
| JP | H11-187841 | 7/1999 |
| JP | 2000-175642 | 6/2000 |
| JP | 2001-095515 | 4/2001 |
| JP | 2001-340063 | 12/2001 |
| JP | 2002-027930 | 1/2002 |
| JP | 3404464 B2 | 5/2003 |
| JP | 2004-008180 | 1/2004 |

(Continued)

OTHER PUBLICATIONS

Elaine, "Homemade Noodles," Nov. 7, 2014 [online], [retrieved Mar. 23, 2023]. Retrieved from the Internet <https://chinasichuanfood.com/homemade-noodles/> (Year: 2014).*
Jungbunzlauer, "Facts: Sodium reduction made easy with sub4salt cute and potassium lactates," Mar. 30, 2017 [online], [ retrieved Mar. 24, 2023].<https://www.jungbunzlauer.com/fileadmin/content/_PDF/PRINT_PROJECTS/Article_facts/JBL_AR_Sodium_reduction_made_easy_2017-062.pdf> (Year: 2017).*
Kloss L, et al., "Sodium intake and its reduction by food reformulation in the European Union—A review," NFSJournal 1 (2015) 9-19 (Year: 2015).*
Office Action issued for Japanese Patent Application No. 2021-189896, dated Feb. 7, 2023, 6 pages including machine translation.
International Search Report issued for PCT/JP2018/044567, dated Mar. 5, 2019, 5 pages.

(Continued)

*Primary Examiner* — Amber R Orlando
*Assistant Examiner* — Jeffrey D Benson
(74) *Attorney, Agent, or Firm* — Hamre, Schumann, Mueller & Larson, P.C.

(57) ABSTRACT

[Problem to be Solved]
The present invention reduces usage of sodium chloride by adding magnesium chloride, and overcomes problems occurring in using magnesium chloride.
[Solution]
The present inventors have found that when magnesium chloride is added instead of sodium chloride to noodle strings and a reducing sugar is further added, preferable well-cooked feeling and appearance are imparted in subsequent production process for instant noodles, and thus, the present invention was accomplished. Specifically, the present invention relates to noodle strings for use in production of instant noodles, the noodle strings containing a raw material powder, magnesium chloride and a reducing sugar.

3 Claims, No Drawings

(56) References Cited

FOREIGN PATENT DOCUMENTS

| JP | 2004-313183 | 11/2004 |
|---|---|---|
| JP | 2005-021152 | 1/2005 |
| JP | 2006-141234 | 6/2006 |
| JP | 2006-274100 | 10/2006 |
| JP | 2008-054661 | 3/2008 |
| JP | 2009-011300 | 1/2009 |
| JP | 4271383 B2 | 6/2009 |
| JP | 2010-521974 | 7/2010 |
| JP | 2011-097919 | 5/2011 |
| JP | 4761534 B2 | 8/2011 |
| JP | 2012-044985 | 3/2012 |
| JP | 2012-090538 | 5/2012 |
| JP | WO2010-107019 A1 | 9/2012 |
| JP | 2013-143934 | 7/2013 |
| JP | 2015-050954 | 3/2015 |
| JP | 2015-084772 | 5/2015 |
| JP | 2015-084773 | 5/2015 |
| JP | 2015-167517 | 9/2015 |
| JP | 2015-213434 | 12/2015 |
| JP | 2016-067293 | 5/2016 |
| JP | 2017-29056 | 2/2017 |
| JP | 2017-175923 | 10/2017 |
| JP | 2018-033363 | 3/2018 |
| JP | 2018-033388 | 3/2018 |
| JP | 2019-062778 | 4/2019 |
| KR | 2010-0105232 | 9/2010 |
| KR | 20100105232 | 9/2010 |
| RU | 2010541 | 4/1994 |
| RU | 2474122 | 2/2013 |
| RU | 2522521 | 7/2014 |
| WO | 2005/077206 | 8/2005 |
| WO | 2012/176882 | 12/2012 |
| WO | 2018/043448 | 3/2018 |
| WO | 2018/043449 | 3/2018 |

OTHER PUBLICATIONS

Written Opinion issued for PCT/JP2018/044567, dated Mar. 5, 2019, 7 pages.
Office Action issued for Russian Patent Application No. 2020107517, dated Jun. 19, 2020, 18 pages including English translation.
Homemade Noodles, China Sichuan Food, Oct. 30, 2014 [online], [retrieved Apr. 28, 2021]. Retrieved from the Internet <https://www.chinasichuanfood.com/homemade-noodles/> (Year: 2014).
The extended European search report issued for the European patent application No. 21195528.1, dated Feb. 7, 2022, 8 pages.
"BBQ Beef Flavoured Noodles," Database GNPD [Online] MINTEL; Mar. 6, 2017, Database accession No. 4664581, 4 pages.
Office Action issued for Brazilian Patent Application No. BR122021017279-0, dated Oct. 24, 2022, 8 pages including English translation.
Office Action issued for Brazilian Patent Application No. BR112020003659-5, dated Oct. 24, 2022, 8 pages including English translation.
Office Action issued for Brazilian Patent Application No. BR122021017328-1, dated Oct. 24, 2022, 8 pages including English translation.
Office Action issued for the U.S. Appl. No. 16/639,998, dated Oct. 15, 2021, 15 pages.
Evans R.A., et al., "Fructose replacement of glucose or sucrose in food or beverages lowers postprandial glucose and insulin without raising triglycerides: a systematic review and meta-analysis," Am J Clin Nutr Jun. 7, 2017; 106: 506-18. (Year: 2017).
Japanese Office Action issued for Japanese Patent Application No. 2017-247484, drafted on Jul. 20, 2021, 7 pages Including machine translation.
M. Kojima, New food additive, "potassium lactate", New food Industry, vol. 57, No. 12, 2015, p. 11-16; partial translation provided.
"Related market trends, topic products", Monthly Food Chemical, vol. 29, No. 10 (342), 2013, p. 34-39; partial translation provided.
Y. Iwama, "Sourness as food additives", Monthly Food Chemical, vol. 31, No. 6 (362), ,2015, p. 72-80; partial translation provided.
"Food additive and a food material column", Monthly Food Chemicals, vol. 29, No. 7 (339), 2013, p. 6; partial translation provided.
Japanese Office Action issued for Japanese Patent Application No. 2017-238519, drafted on Jul. 21, 2021, 13 pages Including machine translation.
Japanese Office Action issued for Japanese Patent Application No. 2017-238520, drafted on Jul. 30, 2021, 6 pages Including machine translation.
European Partial Search Report issued for European Patent Application No. 18889414.1 dated Sep. 9, 2021, 11 pages.
Office Action issued for Korean Patent Application No. 10-2020-7004877, dated Jun. 21, 2022, 8 pages including machine translation.
Third Party Observation submitted for Japanese Patent Application No. 2017-238520, mailed on Nov. 30, 2021, 5 pages including English translation.
Third Party Observation submitted for Japanese Patent Application No. 2017-238519, mailed on Dec. 14, 2021, 8 pages including English translation.
Third Party Observation submitted for Japanese Patent Application No. 2017-247484, mailed on Dec. 14, 2021, 9 pages including English translation.
The Ministry of Agriculture, Forestry and Fisheries website [Mechanism for the Production of Acrylamide in Food] https://www.maff.go.jp/j/syouan/seisaku/acryl_amide/a_syosai/about/sikumi.html; submitted on Nov. 18, 2021, 3 pages including machine translation.
Food Knowledge Mini-Book Series [Introduction to New and Immediate Mini-Books], p. 66, published by Nippon Food Shimbun, Inc, 1998, 4 pages including partial machine translation.
Hideko Kanamitsu, et al., "Study of "Yonezawa Ramen" Salinity for Development of "The Sodium Restriction Soy Sauce Soup"," Yamagata Prefectural Yoshizawa Nutrition University, Kiyoshi No. 3, 2016, 7 pages including machine translation of the Abstract.
"Use of food additives such as lactate," Food Safety Agency No. 0515, No. 3, 2013, 4 pages including machine translation.
Office Action issued for Korean Patent Application No. 10-2021-7027948, dated Jul. 18, 2022, 8 pages including machine translation.
Office Action issued for Korean Patent Application No. 10-2021-7027947, dated Jul. 18, 2022, 8 pages including machine translation.
Office Action issued for Japanese Patent Application No. 2017-238519, dated Feb. 1, 2022, 8 pages including machine translation.
Office Action issued for Chinese Patent Application No. 201880053910.2, dated Apr. 25, 2023, 8 pages including English translation.
Office Action issued for U.S. Appl. No. 17/406,777, dated Mar. 30, 2023, 53 pages.
"Here's The Secret Ingredient That Makes Ramen Noodles So Good," daily meal, Mar. 1, 2017 [online], [retrieved Mar. 22, 2023], Retrieved from the Internet[https://www.thedailymeal.com/eat/heres-secret-ingredient-makes-ramen-hoodles-sogood]. (Year:2017), 7 pages.
Hou G, "Oriental noodles," Advances in food and nutrition research, pp. 141-193, Feb. 2001 (Year: 2001).
Farrand C, et al., "Know Your Noodles! Assessing Variations in Sodium Content of Instant Noodles across Countries," Nutrients 2017, 9, 612 (Year: 2017), 10 pages.
Ajmera R, "Are Instant Noodles Bad for You?" Apr. 15, 2017 [online], [retrieved Mar. 23, 2023]. Retrieved from the Internet <https://www.healthline.com/nutrition/instantnoodles> (Year: 2017), 18 pages.
Office Action issued for U.S. Appl. No. 17/686,063, dated Mar. 28, 2023, 37 pages.
Japan Centre, "Different Types of Japanese Noodles & Recipes," Mar. 31, 2016, retrieved Jul. 12, 2023 [online]. Retrieved from the Internet <https://www.japancentre.com/en/page/62-ramen> (Year: 2016).

(56) References Cited

OTHER PUBLICATIONS

Recipe Tips.com, "Drying Pasta," Dec. 11, 2016, retrieved Jul. 12, 2023 [online]. Retrieved from the Internet <https://web.archive.org/web/20161211040612/https://www.recipetips.com/kitchen-tips/t--528/drying-pasta.asp> (Year: 2016).
Office Action issued for U.S. Appl. No. 17/406,777, dated Jul. 24, 2023, 17 pages.
Khymos, "Speeding up the Maillard reaction," Sep. 26, 2008, retrieved Jul. 24, 2023 [online]. Retrieved from the Internet< https://khymos.org/2008/09/26/speeding-up-the-maillard-reaction/> (Year: 2008).
Office Action issued for U.S. Appl. No. 17/686,063, dated Aug. 4, 2023, 15 pages.

* cited by examiner

METHOD FOR PRODUCING INSTANT NOODLES

TECHNICAL FIELD

The present invention provides instant noodles in which usage of sodium chloride is suppressed, and a method for producing the same.

BACKGROUND ART

In production of noodles in general, salt (sodium chloride) is added in many cases in producing noodle strings from a raw material powder of wheat flour or the like. Such addition aims to improve noodle making properties and texture by enhancing elasticity and extensibility of resultant noodle strings through an action of sodium chloride on gluten contained in the noodle strings.

In recent years, however, a large number of what is called salt-reduced products having a low content of sodium chloride for preventing high blood pressure are placed on the market. According to "Dietary Reference Intakes for Japanese" issued by Ministry of Health, Labor and Welfare, the recommended daily salt intake is less than 9 g for an adult male and less than 7.5 g for an adult female in the 2010 edition, but the recommended daily salt intake is reduced to less than 8 g for an adult male and less than 7 g for an adult female in the 2015 edition. Thus, a concern about salt reduction will be probably continuously increasing.

As techniques for realizing sufficient elasticity and extensibility with usage of sodium chloride suppressed, methods including addition of a thickener such as xanthan gum or locust bean gum, or addition of arginine have been disclosed (Patent Literatures 1 and 2). Besides, as a technique for obtaining good reconstitution with hot water and suppressing sogginess caused by hot water even when usage of sodium chloride is reduced, a method including addition of glycerin organic acid fatty acid ester has been disclosed (Patent Literature 3). These materials have, however, no salty taste, and hence cannot compensate for a salty taste.

Besides, a noodle product into which bittern containing a large amount of magnesium chloride is kneaded instead of sodium chloride has been developed (Patent Literatures 4 and 5). It has been revealed, however, through examination made for achieving the present invention that the following problems arise when magnesium chloride is used instead of sodium chloride:

(1) Since a Maillard reaction and caramelization (hereinafter referred to as the "Maillard reaction and the like") are suppressed by the addition of magnesium chloride, resultant instant noodles are not browned, and hence well-cooked feeling cannot be sufficiently obtained.

(2) It is magnesium chloride present in outer portions of noodle strings that mainly affects a salty taste, and hence, when a conventional production method in which magnesium chloride is homogeneously mixed in whole noodles is employed, most of the magnesium chloride is not involved in providing a salty taste.

(3) When "kansui" and magnesium chloride are mixed with each other, resultant noodles are difficult to bind, which degrades texture.

(4) When usage of magnesium chloride is too large, resultant noodles have a too strong bitter taste and are not suitable for eating.

CITATION LIST

Patent Literature

Patent Literature 1: Japanese Patent Laid-Open No. 2015-84772
Patent Literature 2: Japanese Patent Laid-Open No. 2015-213434
Patent Literature 3: Japanese Patent Laid-Open No. 2016-067293
Patent Literature 4: WO2005/077206
Patent Literature 5: WO2012/176882

SUMMARY OF INVENTION

Technical Problem

An object of the present invention is to reduce usage of sodium chloride by adding magnesium chloride and to overcome the above-described problems occurring in using magnesium chloride.

Solution to Problem

According to the first to fourth inventions, the Maillard reaction and the like are accelerated by adding a reducing sugar, and appropriate appearance (browning) and well-cooked feeling are imparted to resultant noodles even when magnesium chloride is added thereto.

The first invention relates to noodle strings for use in production of instant noodles, containing a raw material powder, magnesium chloride, and a reducing sugar.

The second invention relates to the noodle strings for use in production of instant noodles according to the first invention, in which a content of the magnesium chloride is 0.05 to 1.50% by weight and a content of the reducing sugar is 0.05 to 1.50% by weight in the total amount of the noodle strings.

The third invention relates to a method for producing instant noodles, including a step A of producing noodle strings, and a drying step B of drying the noodle strings at 100° C. or more, in which the noodle strings contain a raw material powder, magnesium chloride, and a reducing sugar, and a content of the magnesium chloride is 0.05 to 1.50% by weight and a content of the reducing sugar is 0.05 to 1.50% by weight in the total amount of the noodle strings.

The fourth invention relates to the method for producing instant noodles according to the third invention, in which the step A of producing noodle strings includes a flavoring step a, and the reducing sugar is added to the noodle strings in the flavoring step a.

In the fifth to seventh inventions, magnesium chloride is distributed in outer portions of noodle strings by adding magnesium chloride after producing the noodle strings, and a reaction between kansui and magnesium chloride is suppressed to cause a salty taste of magnesium chloride to be efficiently exhibited. Besides, although specific mechanism has not been cleared, it has been revealed that a bitter taste derived from magnesium chloride is largely suppressed in this method as compared with that in a conventional method.

The fifth invention relates to a method for producing instant noodles, including at least the following steps C1 to C3:

the step C1 of producing noodle dough by kneading a raw material powder, water and kansui;

the step C2 of producing noodle strings from the noodle dough; and the step C3 of adding magnesium chloride to the noodle strings.

The sixth invention relates to the method for producing instant noodles according to the fifth invention, in which the raw material powder contains gluten.

The seventh invention relates to the method for producing instant noodles according to the fifth or sixth invention, in which the noodle strings are gelatinized before the step C3.

According to the eighth to twelfth inventions, magnesium chloride having a strong salty taste and potassium lactate having an effect of suppressing a bitter taste of magnesium chloride are used together instead of sodium chloride, and thus, instant noodles having an excellent salty taste and suppressed bitter and acidic tastes are provided with usage of sodium suppressed.

The eighth invention relates to instant noodles containing magnesium chloride, potassium lactate and a raw material powder, in which the magnesium chloride is contained in an amount of 0.05 to 1.50% by weight and the potassium lactate is contained in an amount of 0.10 to 2.50% by weight in the total amount of the instant noodles.

The ninth invention relates to the instant noodles according to the eighth invention, further containing sodium chloride, in which the sodium chloride is contained in an amount of 50 to 85 parts by weight with respect to 100 parts by weight of a salty taste component.

The tenth invention relates to the instant noodles according to the eighth or ninth invention, in which the magnesium chloride is contained in an amount of 0.10 to 0.70% by weight in the total amount of the instant noodles.

The eleventh invention relates to the instant noodles according to any one of the eighth to tenth inventions, in which the potassium lactate is contained in an amount of 0.20 to 1.50% by weight in the total amount of the instant noodles.

The twelfth invention relates to the instant noodles according to any one of the ninth to eleventh inventions, in which the sodium chloride is contained in an amount of 1.50 to 2.50% by weight in the total amount of the instant noodles.

Advantageous Effects of Invention

According to the present invention, usage of sodium chloride can be reduced by adding magnesium chloride, and various problems occurring in using magnesium chloride can be overcome.

DESCRIPTION OF EMBODIMENTS

Now, preferred embodiments of the present invention will be specifically described. It is noted that the type of instant noodles is not especially limited in the present invention but may be any type known in the present technical field. Specific examples include udon (wheat noodles), soba (buckwheat noodles), Chinese noodles, pasta and pho.

"Description of Embodiments" will be given dividedly in Section 1 relating to first to fourth inventions, Section 2 relating to fifth to seventh inventions, and Section 3 relating to eighth to twelfth inventions. It is noted that expressions and meanings of terms may be different among the sections in some cases.

Section 1

1-1. Raw Material

Instant noodles of the present invention need to contain a raw material powder, magnesium chloride and a reducing sugar. Now, these raw materials will be described in detail.

1-1-1. Raw Material Powder

As the raw material powder of the present invention, flour such as wheat flour, rice flour, rye flour, barley flour, adlay flour, Japanese millet flour, foxtail millet flour, corn flour, red bean flour, soy flour, buckwheat flour and quinoa flour, starch such as potato starch, tapioca starch and corn starch, and modified starch such as acetylated starch, etherified starch and crosslinked starch can be used.

In the present invention, the raw material powder preferably contains a protein. When the raw material powder contains a protein, the Maillard reaction occurs, and hence preferable well-cooked feeling and appearance can be easily realized. When the raw material powder does not contain a protein, well-cooked feeling and appearance can be imparted merely through caramelization, and hence, preferable well-cooked feeling and appearance are difficult to realize.

Besides, in the present invention, the raw material powder preferably contains gluten, that is, a type of protein. When the raw material powder contains gluten, preferable well-cooked feeling and appearance are realized, and in addition, noodle making properties are improved. Gluten of the present invention more specifically refers to a combination of glutenin and gliadin, or gluten. When glutenin, that is, a type of glutelin, and gliadin, that is, a type of prolamin, are reacted with each other in the presence of moisture, gluten is obtained. Therefore, the combination of glutenin and gliadin is dealt with similarly to gluten.

The raw material powder used in the present invention is preferably wheat flour. Since wheat flour contains glutenin and gliadin, gluten can be obtained simply by kneading it, with water added thereto, to produce noodle dough. Wheat flour is classified into weak flour, all-purpose flour, strong flour, durum wheat flour and the like in accordance with a protein content, and any of these can be suitably used.

When a raw material powder not containing gluten, such as rice flour, barley flour or tapioca starch, is used instead of wheat flour, gluten is preferably added separately. Even when a raw material powder not containing gluten is used, noodle making properties and well-cooked feeling similar to those obtained by using wheat flour can be realized by separately adding gluten.

The raw material powder is a principal component of instant noodles, and preferably occupies 50% by weight or more in the whole raw materials used in the present invention. When the content of the raw material powder is less than 50% by weight, noodle making properties are degraded, and preferable well-cooked feeling and appearance are difficult to obtain.

An amount of gluten used in the noodle strings is changed depending on the type of noodles to be produced. When, for example, udon is to be produced, all purpose flour having comparatively low gluten forming ability is used, and when Chinese noodles and pasta are to be produced, strong flour having comparatively high gluten forming ability is used.

In the present invention, gluten is contained preferably in an amount of 2 to 30% by weight in the total amount of the noodle strings. When gluten is contained in an amount of 2 to 30% by weight, balance between elasticity and extensibility of resultant noodles is good, and texture of the noodles is good. Besides, since the Maillard reaction appropriately occurs, well-cooked feeling and appearance of the noodles are good.

1-1-2. Magnesium Chloride

Magnesium chloride is not limited to magnesium chloride with high purity, but an additive containing magnesium chloride as a principal component such as bittern can be used.

Although magnesium chloride is a substance having a strong bitter taste, since magnesium chloride is used in the present invention to be kneaded into or to dip noodles therein, the taste is less affected as compared with a case where it is used in a soup. Besides, since its offensive taste is masked by a reducing sugar or starch contained in the raw material powder, when an appropriate amount added described below is kept, a salty taste can be enhanced with the offensive taste suppressed.

On the other hand, when magnesium chloride is added, browning tends to be suppressed and well-cooked feeling tends to be degraded. This is probably because the Maillard reaction is suppressed by changing sodium chloride to magnesium chloride, and hence generation of a flavor component and hue change involved in the Maillard reaction are suppressed. This problem can be solved by addition of a reducing sugar described below.

The amount of magnesium chloride added needs to be 0.05 to 1.50% by weight in the total amount of the noodle strings. When the amount of magnesium chloride added is less than 0.05% by weight, the effect resulting from the addition of magnesium chloride is not exhibited, and enhancement of a salty taste and texture cannot be expected. Besides, when the amount of magnesium chloride added is over 1.50% by weight, the bitter taste of magnesium chloride cannot be suppressed.

1-1-3. Reducing Sugar

In the present invention, it is necessary to add a reducing sugar for reducing the influence resulting from the addition of magnesium chloride. A reducing sugar refers to a sugar forming an aldehyde group or a ketone group in a basic solution, and specific examples include monosaccharides such as glucose and fructose, disaccharides such as lactose and maltose, an oligosaccharide, a maltodextrin having a dextrose equivalent of 10 or more, and powdered corn syrup.

In production process of noodles, the Maillard reaction occurs between starch and gluten contained in the raw material powder, but when sodium chloride is replaced with magnesium chloride, the Maillard reaction is suppressed to suppress the generation of a flavor component and the hue change as described above. Therefore, the influence resulting from the addition of magnesium chloride is reduced in the present invention by adding a reducing sugar to cause the Maillard reaction with gluten.

As the reducing sugar used in the present invention, a monosaccharide with which the Maillard reaction can easily proceed is preferred. From the viewpoint that the taste is not affected, glucose having a relatively low degree of sweetness is preferred, and from the viewpoint of adjusting the hue of resultant noodles, fructose (fruit sugar) with which the Maillard reaction can easily proceed is preferred.

An amount of the reducing sugar added needs to be 0.05 to 1.50% by weight in the total amount of the noodle strings. When the amount of the reducing sugar added is 0.05% by weight or less, the influence resulting from the addition of magnesium chloride (the suppression of the Maillard reaction) cannot be reduced. Besides, when the amount of the reducing sugar added is 1.50% by weight or more, a sweet taste is too strong. The amount of the reducing sugar added is more preferably 0.10 to 1.00% by weight.

1-1-4. Sodium Chloride

In the present invention, a predetermined amount of sodium chloride may be added. It is said that excessive intake of sodium chloride increases a risk of high blood pressure, heart disease and the like, but sodium chloride is the most common substance inducing a salty taste, and an offensive taste becomes too strong when a substitute alone is used. Besides, as described above, sodium chloride acts on gluten to enhance the elasticity and extensibility of the noodle strings and to improve the noodle making properties and texture. Therefore, sodium chloride is preferably added in a predetermined amount also in the present invention.

In the present invention, sodium chloride is added preferably in an amount of 0.5 to 3 parts by weight with respect to 100 parts by weight of the row material powder. When the amount of sodium chloride added is less than 0.5 parts by weight, the elasticity and the extensibility of the noodle strings are not sufficiently improved. On the other hand, when the amount of sodium chloride added is over 3 parts by weight, a salty taste owing to sodium chloride becomes so sufficiently strong that there is no need to compensate for a salty taste by adding magnesium chloride.

1-1-5. Kansui

In the present invention, kansui may be added if necessary. Kansui refers to an alkali salt used in production of Chinese noodles, and specific examples include carbonates such as potassium carbonate and sodium carbonate, pyrophosphates such as tetrapotassium pyrophosphate and pyrophosphoric acid, polyphosphates such as potassium polyphosphate and sodium polyphosphate, metaphosphates such as potassium metaphosphate and sodium metaphosphate, and phosphates such as tripotassium phosphate, dipotassium hydrogen phosphate, potassium dihydrogen phosphate and trisodium phosphate.

Kansui is an essential component of Chinese noodles, and attains the following effects:

(1) Kansui acts on an organic matter to cause an alkaline odor of pyrrolidine, trimethylamine or the like.

(2) When kansui is added, gluten contained in wheat shrinks to improve elasticity and smoothness of resultant noodles.

(3) Kansui acts on a flavonoid pigment contained in wheat to color resultant noodles in pale yellow peculiar to Chinese noodles.

1-1-6. Other Raw Materials (Hereinafter Referred to as "Sub Materials")

In the present invention, other raw materials may be added if necessary. For example, potassium chloride widely used as a salty-taste substitute for sodium chloride, a polysaccharide thickener such as pectin or xanthan gum used for adjusting texture of noodles, a whole egg (for Chinese noodles) or spinach (for jade noodles) used for adjusting the hue of noodles, a perfume added for adjusting flavor of noodles, fat or oil for improving productivity of noodles, and the like can be used.

1-2. Production Method

The present invention provides a production method including a step A of producing noodle strings, and a drying step B of drying the noodle strings at 100° C. or more, and the production method specifically includes steps 1 to 6 described below. The step A of producing noodle strings corresponds to the steps 1 to 5 described below, and the drying step B corresponds to the step 6.

(Step 1) Noodle Dough Production Step (Kneading Step)

Kneading water containing kansui, sodium chloride and the like is supplied to the raw material powder, and the resultant is kneaded to produce dough. Kneading time is not especially limited, and the kneading is performed generally for 5 to 30 minutes. Besides, the type of mixer to be used for the kneading is not especially limited, and a batch mixer, a flow jet mixer and the like can be appropriately used. Furthermore, the kneading water may contain a reducing sugar of an essential component, and sub materials such as a polysaccharide thickener and kansui.

(Step 2) Raw Noodle Strings Production Step

A method for producing raw noodle strings can be a method (a) in which the dough obtained in Step 1 is compounded and rolled out to produce a noodle belt having a predetermined thickness, and the noodle belt is cut with a cutting blade or the like (to obtain cut noodles), a method (b) in which the dough is extruded through a hole with a predetermined size (to obtain extruded noodles), and a method (c) in which the dough is extended while being twisted to be formed into the shape of noodles (to obtain hand-rolled noodles). Examples of the cut noodles include Chinese noodles and udon, an example of the extruded noodles includes spaghetti, and an example of the hand-rolled noodles includes somen (thin wheat noodles). Besides, these methods may be combined, and for example, a method in which a noodle belt produced by extrusion is cut (corresponding to a combination of the method (a) and the method (b)) can be employed.

(Step 3) Steaming and/or Boiling Step

In the present invention, the raw noodle strings are gelatinized by steaming and/or boiling if necessary. Starch contained in wheat flour or the like is designated as raw starch, has a dense molecular structure, and is digested slowly, but when heated with water added thereto, the molecular structure is collapsed. Thus, the starch becomes gelatinized starch, which is easily digested. The treatment temperature is not especially limited, and when the raw noodle strings are steamed with water vapor at normal pressure or boiled, the treatment temperature is 95 to 100° C., and when superheated water vapor is used, the treatment is performed generally at 100 to 350° C.

When a precedently gelatinized raw material powder (such as gelatinized wheat flour or gelatinized starch) is used, there is no need to perform the steaming and/or boiling step.

(Step 4) Flavoring Step

In the present invention, a flavoring step is performed if necessary. A flavoring method is not especially limited, and a dipping method in which the noodle strings are dipped in a liquid seasoning, a showering method in which a liquid seasoning is sprayed onto the noodle strings, and the like can be appropriately employed. After the flavoring step, moisture may be adjusted by natural drying or the like. In the flavoring step, magnesium chloride and the reducing sugar, that is, the essential components of the present invention, may be added.

(Step 5) Cutting/Molding Step

In the production of cut noodles, the noodle strings are continuously conveyed on a conveyor up to the flavoring step in general, and in the cutting step, the noodle strings are cut to be provided as one meal amount. Then, the cut noodle strings are automatically put in a retainer (metal mold). In the production of extruded noodles or hand-rolled noodles, the noodle strings are generally sent to a drying step without performing the cutting/molding step.

(Step 6) Drying Step

When noodle strings are dried at 100° C. or more, the Maillard reaction proceeds, and thus, preferable well-cooked feeling and appearance can be realized. Accordingly, a step of drying the noodle strings at 100° C. or more is preferably performed in the present invention. A drying temperature is more preferably 100 to 200° C.

Now, the drying step will be described in detail. Since the noodle strings contain 25 to 65% by weight of moisture before the drying step, it is necessary to dry the noodle strings to have 1 to 15% by weight of moisture for improving storability of resultant instant noodles. Representative drying methods are an instantaneous hot oil drying method and a hot-air drying method.

<Instantaneous Hot Oil Drying Method>

The instantaneous hot oil drying method is a method in which noodle strings are allowed to pass through a hot oil at 100 to 200° C. for 1 to 4 minutes to dewater/dry the noodle strings to have about 2 to 5% by weight of moisture. The instantaneous hot oil drying method is not generally employed for extruded noodles and hand-rolled noodles not requiring molding.

<Hot-Air Drying Method>

The hot-air drying method is a method in which noodle strings are exposed to hot air at 50 to 170° C. for 10 to 180 minutes to dry the noodle strings to have about 8 to 15% by weight of moisture. In the hot-air drying method, there is no need to mold the noodle strings, and hence this method can be employed not only for cut noodles but also for extruded noodles and hand-rolled noodles.

Section 2

2-1. Raw Materials

Instant noodles produced according to the present invention needs to contain magnesium chloride, kansui and a raw material powder. First, these raw materials will be described in detail.

2-1-1. Magnesium Chloride

Magnesium chloride is not limited to magnesium chloride with high purity, but an additive containing magnesium chloride as a principal component such as bittern can be used.

In the present invention, magnesium chloride is contained preferably in an amount of 0.05 to 1.50% by weight in the total amount of resultant instant noodles. When the content of magnesium chloride is less than 0.05% by weight, a salty taste is weak, and when it is over 1.50% by weight, a bitter taste of magnesium chloride is so strong that resultant flavor is easily degraded. The content of magnesium chloride is preferably 0.1 to 1.00% by weight, and more preferably 0.20 to 0.70% by weight in the total amount of the instant noodles.

2-1-2. Kansui

"Kansui" of the present invention refers to an alkali salt used in production of Chinese noodles and udon, and specific examples include carbonates such as potassium carbonate and sodium carbonate, pyrophosphates such as tetrapotassium pyrophosphate and sodium pyrophosphate, polyphosphates such as potassium polyphosphate and sodium polyphosphate, metaphosphates such as potassium metaphosphate and sodium metaphosphate, and phosphates such as tripotassium phosphate, dipotassium hydrogen phosphate, potassium dihydrogen phosphate and trisodium phosphate.

Advantages obtained by adding kansui are as follows:

(1) Kansui acts on an organic matter to cause an alkaline odor of pyrrolidine, trimethylamine or the like.

(2) When kansui is added, gluten contained in wheat shrinks to improve elasticity and smoothness of resultant noodles.

(3) Kansui acts on a flavonoid pigment contained in wheat to color the resultant noodles in pale yellow.

As described above, an insoluble magnesium salt is generated through a reaction between magnesium chloride and kansui. This magnesium salt minimally dissolves in water, and hence has no salty taste. Besides, it causes a problem that a precipitate deposits in a noodle making machine, which degrades the productivity. Furthermore, since kansui does not exhibit its original function, the quality of the resultant noodles is not stabilized, and hence the quality is difficult to control. Accordingly, in the present invention, a flavoring step described below needs to be performed for suppressing the reaction between magnesium chloride and kansui.

Here, the reaction between magnesium chloride and kansui will be simply described. For example, when sodium carbonate is used as kansui, magnesium chloride and sodium carbonate are reacted with each other to generate sodium chloride, magnesium carbonate and magnesium hydroxide. Since magnesium carbonate and magnesium hydroxide minimally dissolve in water, a state as if sand is added to noodle dough occurs, which becomes an obstacle against noodle making. Besides, a salty taste largely depends upon a degree of ionization, and magnesium carbonate and magnesium hydroxide are minimally ionized, and hence minimally have a salty taste.

Besides, also when another substance is used as kansui, a similar phenomenon is found to occur. For example, when tripotassium phosphate is used as kansui, (insoluble) magnesium phosphate is generated, and when sodium pyrophosphate is used as kansui, (insoluble) magnesium pyrophosphate is generated.

2-1-3. Raw Material Powder

As the raw material powder, flour such as wheat flour, rice flour, rye flour, barley flour, adlay flour, Japanese millet flour, foxtail millet flour, corn flour, red bean flour, soy flour, buckwheat flour and quinoa flour, starch such as potato starch, tapioca starch and corn starch, and modified starch such as acetylated starch, etherified starch and crosslinked starch can be used.

In the present invention, the raw material powder preferably contains a protein. When the raw material powder contains a protein, the Maillard reaction occurs, and hence preferable well-cooked feeling and appearance can be easily realized. When the raw material powder does not contain a protein, well-cooked feeling and appearance can be imparted merely through the caramelization, and hence, preferable well-cooked feeling and appearance are difficult to realize.

Besides, in the present invention, the raw material powder preferably contains gluten, that is, a type of protein. When the raw material powder contains gluten, preferable well-cooked feeling and appearance are realized, and in addition, noodle making properties are improved. Gluten of the present invention more specifically refers to a combination of glutenin and gliadin, or gluten. When glutenin, that is, a type of glutelin, and gliadin, that is, a type of prolamin, are reacted with each other in the presence of moisture, gluten is obtained. Therefore, the combination of glutenin and gliadin is dealt with similarly to gluten.

The raw material powder used in the present invention is preferably wheat flour. Since wheat flour contains glutenin and gliadin, gluten can be obtained simply by kneading it, with water added thereto, to produce noodle dough. Wheat flour is classified into weak flour, all-purpose flour, strong flour, durum wheat flour and the like in accordance with a protein content, and any of these can be suitably used.

When a raw material powder not containing gluten, such as rice flour, barley flour or tapioca starch, is used instead of wheat flour, gluten is preferably added separately. Even when a raw material powder not containing gluten is used, noodle making properties and well-cooked feeling similar to those obtained by wheat flour can be realized by separately adding gluten.

The raw material powder is a principal component of instant noodles, and preferably occupies 50% by weight or more in the whole raw materials used in the present invention. When the content of the raw material powder is less than 50% by weight, noodle making properties are degraded, and preferable well-cooked feeling and appearance are difficult to obtain.

In the present invention, gluten is contained preferably in an amount of 2 to 30% by weight in the total amount of the noodle strings. When gluten is contained in the amount of 2 to 30% by weight, balance between elasticity and extensibility of resultant noodles is good, and texture of the noodles is good. Besides, since the Maillard reaction appropriately occurs, well-cooked feeling and appearance of the resultant noodles are good.

2-1-4. Sodium Chloride

It is said that excessive intake of sodium chloride increases a risk of high blood pressure, heart disease and the like, but sodium chloride is the most common substance inducing a salty taste, and an offensive taste becomes too strong when a substitute alone is used. Besides, as described above, sodium chloride acts on gluten to enhance the elasticity and extensibility of resultant noodle strings and to improve the noodle making properties and texture. Therefore, sodium chloride is preferably added in a predetermined amount also in the present invention.

In the present invention, sodium chloride is added preferably in an amount of 0.5 to 3 parts by weight with respect to 100 parts by weight of the row material powder. When the amount of sodium chloride added is less than 0.5 parts by weight, the elasticity and the extensibility of resultant noodle strings are not sufficiently improved. On the other hand, when the amount of sodium chloride added is over 3 parts by weight, a salty taste owing to sodium chloride becomes so sufficiently strong that there is no need to compensate for a salty taste by adding magnesium chloride.

2-1-5. Sub Materials

In the present invention, sub materials may be added in addition to the above-described raw materials. Specifically, a polysaccharide thickener such as pectin or xanthan gum used for adjusting texture of resultant noodles, a whole egg (for Chinese noodles) or spinach (for jade noodles) used for adjusting the hue of the noodles, a sugar such as glucose or fructose added for adjusting the hue and sweetness, a perfume added for adjusting flavor of noodles, fat or oil for improving productivity of noodles, and the like can be used.

2-2. Production Method

Next, a method for producing instant noodles will be specifically described.

(Step C1) Noodle Dough Production Step (Kneading Step)

Kneading water containing at least kansui is supplied to the raw material powder, and the resultant is kneaded to produce dough. The kneading time is not especially limited, and the kneading is performed generally for 5 to 30 minutes. Besides, the type of mixer to be used for the kneading is not especially limited, and a batch mixer, a flow jet mixer and the like can be appropriately used. Furthermore, the kneading water may contain sub materials such as sodium chloride, a hue adjustor like a reducing sugar or the like, and a polysaccharide thickener.

(Step C2-1) Raw Noodle Strings Production Step

A method for producing raw noodle strings can be a method (a) in which the dough obtained in Step C1 is compounded and rolled out to produce a noodle belt having a predetermined thickness, and the noodle belt is cut with a cutting blade or the like (to obtain cut noodles), a method (b) in which the dough is extruded through a hole with a predetermined size (to obtain extruded noodles), and a method (c) in which the dough is extended while being twisted to be formed into the shape of noodles (to obtain hand-rolled noodles). Examples of the cut noodles include Chinese noodles and udon, an example of the extruded noodles includes spaghetti, and an example of the hand-rolled noodles includes somen. Besides, these methods may be combined, and for example, a method in which a noodle belt produced by extrusion is cut (corresponding to a combination of the method (a) and the method (b)) can be employed.

(Step C2-2) Steaming and/or Boiling Step

In the present invention, the raw noodle strings may be gelatinized by steaming and/or boiling if necessary to obtain gelatinized noodle strings. Starch contained in wheat flour or the like is designated as raw starch, has a dense molecular structure, and is digested slowly, but when heated with water added thereto, the molecular structure is collapsed. Thus, the starch becomes gelatinized starch, which is easily digested. The treatment temperature is not especially limited, and when the raw noodle strings are steamed with water vapor at normal pressure or boiled, the treatment temperature is 95 to 100° C., and when superheated water vapor is used, the treatment is performed generally at 100 to 350° C.

When a precedently gelatinized raw material powder (such as gelatinized wheat flour or gelatinized starch) is used, there is no need to perform the steaming and/or boiling step. Also when a "method in which the noodle strings are boiled in hot water containing magnesium chloride" is employed in a flavoring step, there is no need to perform this step.

(Step C3) Flavoring Step

In the present invention, a step of adding magnesium chloride to the noodle strings (hereinafter referred to as the "flavoring step") needs to be performed. When magnesium chloride is added after forming the noodle strings, a reaction between kansui and magnesium chloride is suppressed so that a salty taste can be effectively imparted. Besides, since magnesium chloride is added after forming the noodle strings, the noodle making properties are not harmfully affected.

A flavoring method is not especially limited, and the method in which the noodle strings are boiled in hot water containing magnesium chloride, a method in which the noodle strings are dipped in a liquid seasoning containing magnesium chloride, and/or a method in which a liquid seasoning is sprayed onto the noodle strings, and the like can be appropriately employed.

From the viewpoint of improving a salty taste and texture, the noodle strings are preferably gelatinized by performing Step C2-1 described above before the flavoring step in the present invention.

When an alkaline material is used in the flavoring step, it is preferable that a liquid seasoning containing the alkaline material is prepared separately from the liquid seasoning containing magnesium chloride to be separately added. Besides, as a flavoring order, it is preferable that the liquid seasoning containing the alkaline material is added priorly and the liquid seasoning containing magnesium chloride is added thereafter. When such a flavoring order is employed, a reaction between magnesium chloride and the alkaline material can be minimized.

(Step C4) Cutting/Molding Step

In the production of cut noodles, the noodle strings are continuously conveyed on a conveyor up to the flavoring step in general, and in the cutting step, the noodle strings are cut to be provided as one meal amount. Then, the cut noodle strings are automatically put in a retainer (metal mold). In the production of extruded noodles or hand-rolled noodles, the noodle strings are generally sent to a drying step without performing the cutting/molding step.

(Step C5) Drying Step

Since the noodle strings contain 25 to 65% by weight of moisture before the drying step, it is necessary to dry the noodle strings to have 1 to 15% by weight of moisture for improving storability of resultant instant noodles. Representative drying methods are the instantaneous hot oil drying method and the hot-air drying method.

<Instantaneous Hot Oil Drying Method>

The instantaneous hot oil drying method is a method in which noodle strings are allowed to pass through a hot oil at 100 to 200° C. for 1 to 4 minutes to dewater/dry the noodle strings to have about 2 to 5% by weight of moisture. The instantaneous hot oil drying method is not generally employed for extruded noodles and hand-rolled noodles not requiring molding.

<Hot-Air Drying Method>

The hot-air drying method is a method in which noodle strings are exposed to hot air at 50 to 170° C. for 10 to 180 minutes to dry the noodle strings to have about 8 to 15% by weight of moisture. In the hot-air drying method, there is no need to mold the noodle strings, and hence this method can be employed not only for cut noodles but also for extruded noodles and hand-rolled noodles.

Section 3

3-1. Raw Materials

Raw materials used in the present invention will be specifically described.

3-1-1. Magnesium Chloride

Magnesium chloride is not limited to magnesium chloride with high purity, but an additive containing magnesium chloride as a principal component such as bittern can be used. Since magnesium chloride is a material having a strong bitter taste, if reduction of a salty taste due to reduction of sodium chloride is to be compensated only by increasing the amount of magnesium chloride, a bitter taste becomes so strong that the resultant cannot be suitably eaten.

Therefore, potassium lactate having a different type of bitter taste from that of magnesium chloride is used together in the present invention, and thus, a salty taste is enhanced with the bitter taste peculiar to magnesium chloride suppressed. Besides, since the raw material powder contains starch having a masking effect in the present invention, a salty taste and a bitter taste are masked by starch, and therefore, a difference between sodium chloride and magnesium chloride is more difficult to perceive.

Magnesium chloride is commercially available in the form of a hexahydrate in general, but the term "magnesium chloride" herein refers to magnesium chloride anhydride.

In the present invention, magnesium chloride needs to be contained in an amount of 0.05 to 1.50% by weight in the total amount of the instant noodles. When magnesium chloride is contained in an amount less than 0.05% by weight, a salty taste is so weak that it cannot be a substitute for sodium chloride. Besides, when magnesium chloride is contained in an amount exceeding 1.50% by weight, a bitter taste of magnesium chloride is too strong. Although depending on the amounts of sodium chloride and potassium lactate used together, magnesium chloride is contained more preferably in an amount of 0.1 to 0.70% by weight in the total amount of the instant noodles.

3-1-2. Potassium Lactate

Potassium lactate has strong acidic taste and bitter taste by itself, but has an effect of increasing a salty taste and has a different type of bitter taste from that of magnesium chloride described above. Therefore, when used together with magnesium chloride in a predetermined ratio, a salty taste can be enhanced with an acidic taste and a bitter taste peculiar to potassium lactate suppressed. Besides, since the raw material powder contains starch having a masking effect, a salty taste, a bitter taste and an acidic taste are masked by starch, and thus, a difference in taste from sodium chloride is more difficult to perceive.

Furthermore, although a bitter taste of magnesium chloride described above is derived principally from a magnesium ion, a bitter taste of potassium lactate is presumed to be derived principally from a potassium ion. Therefore, magnesium chloride and potassium lactate have different types of bitter taste. Specifically, as compared with a case where a salty taste is enhanced by using magnesium chloride alone or potassium lactate alone, a bitter taste tends to be difficult to perceive when magnesium chloride and potassium lactate are used together.

Specifically, potassium lactate needs to be contained in an amount of 0.10 to 2.50% by weight in the total amount of the instant noodles. When the content of potassium lactate is less than 0.10% by weight, the effect of increasing a salty taste is weak. On the other hand, when the content of potassium lactate is over 2.50% by weight, an acidic taste of potassium lactate is so strong that flavor of the resultant noodles is degraded. Besides, water absorption becomes too high, and hence the noodles tend to easily become soggy. The content of potassium lactate is preferably 0.20 to 1.50% by weight, and more preferably 0.25 to 1.00% by weight in the total amount of the instant noodles.

3-1-3. Sodium Chloride

In the present invention, a predetermined amount of sodium chloride may be added. It is said that excessive intake of sodium chloride increases a risk of high blood pressure, heart disease and the like, but sodium chloride is the most common substance inducing a salty taste, and an offensive taste of a substitute (such as magnesium chloride or potassium lactate) can be reduced. Besides, as described above, sodium chloride acts on gluten to enhance the elasticity and extensibility of resultant noodle strings and to improve the noodle making properties and texture. Therefore, sodium chloride is preferably added in a predetermined amount also in the present invention.

Next, the relationship between a blending ratio among magnesium chloride, potassium lactate and sodium chloride, and a bitter taste and an acidic taste will be described. The term "salty taste component" used in the following description is used as a generic name of magnesium chloride, potassium lactate and sodium chloride.

The amount of sodium chloride to be blended is preferably 0.55 to 0.85 in terms of a weight ratio of sodium chloride in the salty taste component (hereinafter simply referred to as the "weight ratio"). When the weight ratio is over 0.85 (when the usage of sodium chloride is large), sodium chloride occupies most of the salty taste component, which is insufficient from the viewpoint of suppression of the usage of sodium. Besides, when the weight ratio is lower than 0.55 (when the usage of sodium chloride is small), an offensive taste becomes so strong that the resultant cannot be suitably eaten.

3-1-4. Raw Material Powder

As the raw material powder, flour such as wheat flour, rice flour, rye flour, barley flour, adlay flour, Japanese millet flour, foxtail millet flour, corn flour, red bean flour, soy flour, buckwheat flour and quinoa flour, starch such as potato starch, tapioca starch and corn starch, and modified starch such as acetylated starch, etherified starch and crosslinked starch can be used.

In the present invention, the raw material powder preferably contains a protein. When the raw material powder contains a protein, the Maillard reaction occurs, and hence preferable well-cooked feeling and appearance can be easily realized. When the raw material powder does not contain a protein, well-cooked feeling and appearance can be imparted merely through the caramelization, and hence, preferable well-cooked feeling and appearance are difficult to realize.

Besides, in the present invention, the raw material powder preferably contains gluten, that is, a type of protein. When the raw material powder contains gluten, preferable well-cooked feeling and appearance are realized, and in addition, noodle making properties are improved. Gluten of the present invention more specifically refers to a combination of glutenin and gliadin, or gluten. When glutenin, that is, a type of glutelin, and gliadin, that is, a type of prolamin, are reacted with each other in the presence of moisture, gluten is obtained. Therefore, the combination of glutenin and gliadin is dealt with similarly to gluten.

The raw material powder used in the present invention is preferably wheat flour. Since wheat flour contains glutenin and gliadin, gluten can be obtained simply by kneading it, with water added thereto, to produce noodle dough. Wheat flour is classified into weak flour, all-purpose flour, strong flour, durum wheat flour and the like in accordance with a protein content, and any of these can be suitably used.

When a raw material powder not containing gluten, such as rice flour, barley flour or tapioca starch, is used instead of wheat flour, gluten is preferably added separately. Even when a raw material powder not containing gluten is used, noodle making properties and well-cooked feeling similar to those obtained by wheat flour can be realized by separately adding gluten.

The raw material powder is a principal component of instant noodles, and preferably occupies 50% by weight or more in the whole raw materials used in the present invention. When the raw material powder is contained in an amount less than 50% by weight, noodle making properties are degraded, and preferable well-cooked feeling and appearance are difficult to obtain.

In the present invention, gluten is contained preferably in an amount of 2 to 30% by weight in the total amount of the noodle strings. When gluten is contained in the amount of 2 to 30% by weight, balance between the elasticity and the extensibility of resultant noodles is good, and texture of the noodles is good. Besides, since the Maillard reaction appropriately occurs, well-cooked feeling and appearance of the resultant noodles are good.

3-1-5. Kansui

In the present invention, kansui may be added if necessary. Kansui refers to an alkali salt used in production of Chinese noodles, and specific examples include carbonates such as potassium carbonate and sodium carbonate, pyrophosphates such as tetrapotassium pyrophosphate and pyrophosphoric acid, polyphosphates such as potassium polyphosphate and sodium polyphosphate, metaphosphates such as potassium metaphosphate and sodium metaphosphate, and phosphates such as tripotassium phosphate, dipotassium hydrogen phosphate, potassium dihydrogen phosphate and trisodium phosphate.

Kansui is an essential component of Chinese noodles, and attains the following effects:

(1) Kansui acts on an organic matter to cause an alkaline odor of pyrrolidine, trimethylamine or the like.

(2) When kansui is added, gluten contained in wheat shrinks to improve elasticity and smoothness of resultant noodles.

(3) Kansui acts on a flavonoid pigment contained in wheat to color resultant noodles in pale yellow peculiar to Chinese noodles.

3-1-6. Other Raw Materials (Hereinafter Referred to as "Sub Materials")

In the present invention, other raw materials may be added if necessary. For example, potassium chloride widely used as a salty-taste substitute for sodium chloride, a polysaccharide thickener such as pectin or xanthan gum used for adjusting texture of noodles, a whole egg (for Chinese noodles) or spinach (for jade noodles) used for adjusting the hue of noodles, a perfume added for adjusting flavor of noodles, fat or oil for improving productivity of noodles, and the like can be used.

3-2. Production Method

Next, a method for producing instant noodles will be illustrated, and it is noted that the production method is not limited to the following.

(Step 1) Noodle Dough Production Step (Kneading Step)

Kneading water containing kansui, sodium chloride and the like is supplied to the raw material powder, and the resultant is kneaded to produce dough. The kneading time is not especially limited, and the kneading is performed generally for 5 to 30 minutes. Besides, the type of mixer to be used for the kneading is not especially limited, and a batch mixer, a flow jet mixer and the like can be appropriately used. Furthermore, the kneading water may contain a reducing sugar of an essential component, and sub materials such as a polysaccharide thickener and kansui.

(Step 2) Raw Noodle Strings Production Step

A method for producing raw noodle strings can be a method (a) in which the dough obtained in Step 1 is compounded and rolled out to produce a noodle belt having a predetermined thickness, and the noodle belt is cut with a cutting blade or the like (to obtain cut noodles), a method (b) in which the dough is extruded through a hole with a predetermined size (to obtain extruded noodles), and a method (c) in which the dough is extended while being twisted to be formed into the shape of noodles (to obtain hand-rolled noodles). Examples of the cut noodles include Chinese noodles and udon, an example of the extruded noodles includes spaghetti, and an example of the hand-rolled noodles includes somen. Besides, these methods may be combined, and for example, a method in which a noodle belt produced by extrusion is cut (corresponding to a combination of the method (a) and the method (b)) can be employed.

(Step 3) Steaming and/or Boiling Step

In the present invention, the raw noodle strings are gelatinized by steaming and/or boiling if necessary. Starch contained in wheat flour or the like is designated as raw starch, has a dense molecular structure, and is digested slowly, but when heated with water added thereto, the molecular structure is collapsed. Thus, the starch becomes gelatinized starch, which is easily digested. The treatment temperature is not especially limited, and when the raw noodle strings are steamed with water vapor at normal pressure or boiled, the treatment temperature is 95 to 100° C., and when superheated water vapor is used, the treatment is performed generally at 100 to 350° C.

When a precedently gelatinized raw material powder (such as gelatinized wheat flour or gelatinized starch) is used, there is no need to perform the steaming and/or boiling step.

(Step 4) Flavoring Step

In the present invention, a flavoring step is performed if necessary. A flavoring method is not especially limited, and a dipping method in which the noodle strings are dipped in a liquid seasoning, a showering method in which a liquid seasoning is sprayed onto the noodle strings, and the like can be appropriately employed. After the flavoring step, moisture may be adjusted by natural drying or the like. In the flavoring step, magnesium chloride and the reducing sugar, that is, the essential components of the present invention, may be added.

(Step 5) Cutting/Molding Step

In the production of cut noodles, the noodle strings are continuously conveyed on a conveyor up to the flavoring step in general, and in the cutting step, the noodle strings are cut to be provided as one meal amount. Then, the cut noodle strings are automatically put in a retainer (metal mold). In the production of extruded noodles or hand-rolled noodles, the noodle strings are generally sent to a drying step without performing the cutting/molding step.

(Step 6) Drying Step

When noodle strings are dried at 100° C. or more, the Maillard reaction proceeds, and thus, preferable well-cooked feeling and appearance can be realized. Accordingly, a step of drying the noodle strings at 100° C. or more is preferably performed in the present invention. It is noted that a drying temperature is more preferably 100 to 200° C.

Now, the drying step will be described in detail. Since the noodle strings contain 25 to 65% by weight of moisture before the drying step, it is necessary to dry the noodle strings to have 1 to 15% by weight of moisture for improving storability of resultant instant noodles. Representative drying methods are the instantaneous hot oil drying method and the hot-air drying method.

<Instantaneous Hot Oil Drying Method>

The instantaneous hot oil drying method is a method in which noodle strings are allowed to pass through a hot oil at 100 to 200° C. for 1 to 4 minutes to dewater/dry the noodle strings to have about 2 to 5% by weight of moisture. It is noted that the instantaneous hot oil drying method is not generally employed for extruded noodles and hand-rolled noodles not requiring molding.

<Hot-Air Drying Method>

The hot-air drying method is a method in which noodle strings are exposed to hot air at 50 to 170° C. for 10 to 180 minutes to dry the noodle strings to have about 8 to 15% by weight of moisture. In the hot-air drying method, there is no need to mold the noodle strings, and hence this method can be employed not only for cut noodles but also for extruded noodles and hand-rolled noodles.

EXAMPLES

"Examples" will be described, similarly to "Description of Embodiments", dividedly in Section 1 relating to the first to fourth inventions, Section 2 relating to the fifth to seventh inventions, and Section 3 relating to the eighth to twelfth inventions.

Section 1

Comparative Example 101

900 g of wheat flour and 100 parts of acetylated tapioca starch were powder mixed, and to the resultant powder, kneading water containing 345 parts of water, 15 parts of sodium chloride and 3 parts of kansui (potassium carbonate:sodium carbonate=3:2) was added, and the resultant was mixed using a batch mixer for 15 minutes to produce noodle dough.

Next, a roll was used to compound and roll out the dough to produce a noodle belt with a thickness of 0.9 mm, and the noodle belt was cut with a cutting blade roll (round blade No. 20, groove width: 1.5 mm) to obtain noodle strings (cut noodles). The noodle strings were steamed with saturated steam of 270 kg/h for 2 minutes to produce gelatinized noodle strings 101.

The gelatinized noodle strings 101 were dipped in a liquid seasoning (1 litter) containing water and 90 parts of sodium chloride for 20 seconds, the resultant was cut into a length of about 30 cm (100 g), and filled in a retainer. The noodle strings in the retainer was dried in palm oil at 150° C. for 2 minutes and 30 seconds (by the instantaneous hot oil drying method) to produce instant noodles 101 (Comparative Example 101) having a moisture content of 2% by weight. The weight of the noodle strings filled in the retainer was 100 g, and the weight of the instant noodles 101 after drying was 66 g.

Comparative Example 102

The gelatinized noodle strings 101 were dipped in a liquid seasoning (1000 ml) containing water, 70 parts of sodium chloride and 20 parts of magnesium chloride for 20 seconds, and dried under the same conditions as in Comparative Example 101 to produce instant noodles 102 (Comparative Example 102) having a moisture content of 2% by weight.

Example 101

The gelatinized noodle strings 101 were dipped in a liquid seasoning (1000 ml) containing water, 70 parts of sodium chloride, 20 parts of magnesium chloride and 5 parts of glucose for 20 seconds, and dried under the same conditions as in Comparative Example 101 to produce instant noodles 103 (Example 101) having a moisture content of 2% by weight.

Examples 102 to 110

Materials to be contained in a liquid seasoning were changed as shown in Table 1 to produce instant noodles 104 to 112 (Examples 102 to 110). Moisture contents were adjusted so that the capacity of all the liquid seasonings could be 1000 ml.

The amounts of magnesium chloride contained in the noodle strings before and after the drying, and the amount of the reducing sugar (glucose or fructose) contained in the noodle strings before the drying are shown in Table 1. It is noted that each numerical value shown in Table 1 is not an actually measured value but a calculated value calculated based on "blending amounts of materials", "usage of liquid seasoning" (23 g of the liquid seasoning soaked in 100 g of noodle strings before the drying and 77 g of the gelatinized noodle strings), and "weight change of noodle strings (weight of noodle strings before the drying: 100 g, weight thereof after the drying: 66 g)".

TABLE 1

| | | | Comparative Example | | Example | | | | | | | | | | |
|---|---|---|---|---|---|---|---|---|---|---|---|---|---|---|---|
| | | | 101 Instant Noodles 101 | 102 Instant Noodles 102 | 101 Instant Noodles 103 | 102 Instant Noodles 104 | 103 Instant Noodles 105 | 104 Instant Noodles 106 | 105 Instant Noodles 107 | 106 Instant Noodles 108 | 107 Instant Noodles 109 | 108 Instant Noodles 110 | 109 Instant Noodles 111 | 110 Instant Noodles 112 |
| Noodle Strings (parts) | Dough | Wheat Flour | 900 | 900 | 900 | 900 | 900 | 900 | 900 | 900 | 900 | 900 | 900 | 900 |
| | | Acetylated Tapioca Starch | 100 | 100 | 100 | 100 | 100 | 100 | 100 | 100 | 100 | 100 | 100 | 100 |
| | Kneading Water | Water | 345 | 345 | 345 | 345 | 345 | 345 | 345 | 345 | 345 | 345 | 345 | 345 |
| | | Sodium Chloride | 15 | 15 | 15 | 15 | 15 | 15 | 15 | 15 | 15 | 15 | 15 | 15 |
| | | Kansui | 3 | 3 | 3 | 3 | 3 | 3 | 3 | 3 | 3 | 3 | 3 | 3 |
| Liquid Seasoning (parts) | | Sodium Chloride | 90 | 70 | 70 | 70 | 70 | 70 | 70 | 80 | 60 | 40 | 0 | 70 |
| | | Magnesium Chloride (hexahydrate) | | 20 | 20 | 20 | 20 | 20 | 20 | 10 | 30 | 50 | 90 | 20 |
| | | Glucose | | | 5 | 10 | 20 | 30 | 40 | 5 | 15 | 25 | 45 | |
| | | Fructose | | | | | | | | | | | | 10 |
| Before Drying (wt %) | | Magnesium Chloride (hexahydrate) | 0.46 | 0.46 | 0.46 | 0.46 | 0.46 | 0.46 | 0.23 | 0.69 | 1.15 | 2.07 | 0.46 | |
| | | Magnesium Chloride (in terms of anhydride) | | 0.22 | 0.22 | 0.22 | 0.22 | 0.22 | 0.22 | 0.11 | 0.32 | 0.54 | 0.97 | 0.22 |
| | | Glucose | | | 0.12 | 0.23 | 0.46 | 0.69 | 0.92 | 0.12 | 0.35 | 0.58 | 1.04 | |
| | | Fructose | | | | | | | | | | | | 0.23 |
| After Drying (wt %) | | Magnesium Chloride (in terms of anhydride) | | 0.33 | 0.33 | 0.33 | 0.33 | 0.33 | 0.33 | 0.16 | 0.49 | 0.82 | 1.47 | 0.33 |

(Evaluation)
(Hue: Evaluation of L*a*b* Color Space)

The instant noodles 101 to 112 were measured for L*a*b* values using a chroma meter (CR-410, manufactured by Konica Minolta Sensing, Inc.). It is noted that Table 2 shows merely *a values that were remarkably changed.

(Salty Taste)

The "salty taste" of the instant noodles was evaluated by ten expert panelists with Comparative Example 101 used as a reference as follows:

5: Nine or more panelists evaluated that the salty taste was "equivalent to that of the standard (Comparative Example 101)".

4: Three to eight panelists evaluated that the salty taste was "equivalent to that of the standard".

3: One or two panelists evaluated that the salty taste was "equivalent to that of the standard".

2: No panelist evaluated that the salty taste was "equivalent to that of the standard" but the bitter taste was at an edible level.

1: The bitter taste was so strong that the noodles were difficult to eat.

(Other Evaluation)

In the evaluation of the salty taste, when nine or more of the ten panelists felt that the noodles were sweeter than the "standard", the noodles were evaluated to have a "sweet taste", and when nine or more of the ten panelists felt that the noodles were bitterer than the "standard", the noodles were evaluated to have a "bitter taste".

adding a reducing sugar (through comparison between Comparative Example 102 and Examples 101 to 110). According to the present invention, the adverse effect (the suppression of the Maillard reaction and the like) caused by the addition of magnesium chloride can be adjusted by adding a reducing sugar.

Although not shown in the table, the well-cooked feeling (roasted feeling) of instant noodles was substantially associated with change in the hue. Specifically, there was a tendency, found by the ten panelists, as compared with the standard (Comparative Example 101), that the well-cooked feeling was slightly weaker in Example 1, equivalent in Examples 102 and 103, and slightly stronger in Examples 104 and 105. Besides, Comparative Example 2 containing no reducing sugar had no well-cooked feeling.

Section 2

Comparative Example 201

Standard Sample 900 g of wheat flour and 100 parts of acetylated tapioca starch were powder mixed, and to the resultant powder, kneading water containing 345 parts of water, 15 parts of sodium chloride and 3 parts of kansui (potassium carbonate: sodium carbonate=3:2) was added, and the resultant was mixed using a batch mixer for 15 minutes to produce noodle dough.

TABLE 2

| | | Comparative Example | | Example | | | | | | | | | |
|---|---|---|---|---|---|---|---|---|---|---|---|---|---|
| | | 101 Instant Noodles 101 | 102 Instant Noodles 102 | 101 Instant Noodles 103 | 102 Instant Noodles 104 | 103 Instant Noodles 105 | 104 Instant Noodles 106 | 105 Instant Noodles 107 | 106 Instant Noodles 108 | 107 Instant Noodles 109 | 108 Instant Noodles 110 | 109 Instant Noodles 111 | 110 Instant Noodles 112 |
| Liquid Seasoning (parts) | Sodium Chloride | 90 | 70 | 70 | 70 | 70 | 70 | 70 | 80 | 60 | 40 | 0 | 70 |
| | Magnesium Chloride (hexahydrate) | | 20 | 20 | 20 | 20 | 20 | 20 | 10 | 30 | 50 | 90 | 20 |
| | Glucose | | | 5 | 10 | 20 | 30 | 40 | 5 | 15 | 25 | 45 | |
| | Fructose | | | | | | | | | | | | 10 |
| Before Drying (wt %) | Magnesium Chloride (hexahydrate) | | 0.46 | 0.46 | 0.46 | 0.46 | 0.46 | 0.46 | 0.23 | 0.69 | 1.15 | 2.07 | 0.46 |
| | Magnesium Chloride (in terms of anhydride) | | 0.22 | 0.22 | 0.22 | 0.22 | 0.22 | 0.22 | 0.11 | 0.32 | 0.54 | 0.97 | 0.22 |
| | Glucose | | | 0.12 | 0.23 | 0.46 | 0.69 | 0.92 | 0.12 | 0.35 | 0.58 | 1.04 | |
| | Fructose | | | | | | | | | | | | 0.23 |
| Evaluation | a* Value | 0.91 | −0.29 | 0.18 | 2.15 | 2.50 | 4.45 | 5.10 | 1.71 | 2.19 | 2.45 | 2.60 | 2.28 |
| | Salty Taste | 5 (Standard) | 4 | 4 | 5 | 5 | 4 | 4 | 5 | 4 | 3 | 3 | 4 |
| | Other | | | | | | Sweat Taste | | | Bitter Taste | Bitter Taste Sweat Taste | | |

(Conclusion)

It was confirmed that the Maillard reaction and the like are suppressed by adding magnesium chloride (through comparison between Comparative Examples 101 and 102), and that the Maillard reaction and the like are accelerated by Next, a roll was used to compound and roll out the dough to produce a noodle belt with a thickness of 0.9 mm, and the noodle belt was cut with a cutting blade roll (round blade No. 20, groove width: 1.5 mm) to obtain noodle strings (cut noodles). The noodle strings were steamed with saturated steam of 270 kg/h for 2 minutes to produce gelatinized noodle strings 201.

The gelatinized noodle strings 201 were dipped in a liquid seasoning (1 litter) containing water and 90 parts of sodium chloride for 20 seconds, the resultant was cut into a length of about 30 cm (100 g), and filled in a retainer. The noodle strings in the retainer was dried in palm oil at 150° C. for 2 minutes and 30 seconds (by the instantaneous hot oil drying method) to produce a standard sample (Comparative Example 201) having a moisture content of 2% by weight. The weight of the noodle strings filled in the retainer was 100 g, and the weight of the sample after drying was 66 g.

Example 201

The gelatinized noodle strings 201 were dipped in a liquid seasoning (1000 ml) containing water, 90 parts of sodium chloride and 20 parts of magnesium chloride hexahydrate for 20 seconds, and dried under the same conditions as in Comparative Example 201 to produce instant noodles (Example 201) having a moisture content of 2% by weight.

Comparative Example 202

900 g of wheat flour and 100 parts of acetylated tapioca starch were powder mixed, and to the resultant powder, kneading water containing 345 parts of water, 15 parts of sodium chloride, 3 parts of kansui (potassium carbonate:sodium carbonate=3:2) and 8.15 parts of magnesium chloride hexahydrate was added, and the resultant was mixed using a batch mixer for 15 minutes to produce noodle dough.

Next, a roll was used to compound and roll out the dough to produce a noodle belt with a thickness of 0.9 mm, and the noodle belt was cut with a cutting blade roll (round blade No. 20, groove width: 1.5 mm) to obtain noodle strings. The noodle strings were steamed with saturated steam of 270 kg/h for 2 minutes to produce gelatinized noodle strings 202.

The gelatinized noodle strings 202 were dipped in a liquid seasoning (1 litter) containing water and 90 parts of sodium chloride for 20 seconds, the resultant was cut into a length of about 30 cm, and filled in a retainer. The noodle strings in the retainer was dried in palm oil at 150° C. for 2 minutes and 30 seconds (by the instantaneous hot oil drying method) to produce instant noodles (Comparative Example 202) having a moisture content of 2% by weight.

Comparative Example 203

900 g of wheat flour, 100 parts of acetylated tapioca starch and 8.15 parts of magnesium chloride hexahydrate were powder mixed, and to the resultant powder, kneading water containing 345 parts of water, 15 parts of sodium chloride and 3 parts of kansui (potassium carbonate:sodium carbonate=3:2) was added, and the resultant was mixed using a batch mixer for 15 minutes to produce noodle dough.

Next, a roll was used to compound and roll out the dough to produce a noodle belt with a thickness of 0.9 mm, and the noodle belt was cut with a cutting blade roll (round blade No. 20, groove width: 1.5 mm) to obtain noodle strings (cut noodles). The noodle strings were steamed with saturated steam of 270 kg/h for 2 minutes to produce gelatinized noodle strings 203.

The gelatinized noodle strings 203 were dipped in a liquid seasoning (1 litter) containing water and 90 parts of sodium chloride for 20 seconds, the resultant was cut into a length of about 30 cm, and filled in a retainer. The noodle strings in the retainer was dried in palm oil at 150° C. for 2 minutes and 30 seconds (by the instantaneous hot oil drying method) to produce instant noodles (Comparative Example 203) having a moisture content of 2% by weight.

The amounts of sodium chloride and magnesium chloride contained in the noodle strings before and after the drying are shown in Table 3. It is noted that each numerical value shown in Table 3 is not an actually measured value but a calculated value calculated based on "blending amounts of materials", "usage of liquid seasoning" (23 g of the liquid seasoning soaked in 100 g of noodle strings before the drying and 77 g of the gelatinized noodle strings), and "weight change of noodle strings (weight of noodle strings before the drying: 100 g, weight thereof after the drying: 66 g)".

TABLE 3

| | | | Comparative Example 201 Standard | Example 201 | Comparative Example 202 | Comparative Example 203 |
|---|---|---|---|---|---|---|
| Noodle Strings (parts) | Dough | Wheat Flour | 900 | 900 | 900 | 900 |
| | | Acetylated Tapioca Starch | 100 | 100 | 100 | 100 |
| | | Magnesium Chloride (hexahydrate) | | | | 8.15 |
| | Kneading Water | Water | 345 | 345 | 345 | 345 |
| | | Sodium Chloride | 15 | 15 | 15 | 15 |
| | | Kansui | 3 | 3 | 3 | 3 |
| | | Magnesium Chloride (hexahydrate) | | | 8.15 | |
| | Liquid Seasoning (parts) | Water | 1000 | 1000 | 1000 | 1000 |
| | | Sodium Chloride | 90 | 90 | 90 | 90 |
| | | Magnesium Chloride (hexahydrate) | | 20 | | |
| | Before Drying (wt %) | Sodium Chloride | 2.92 | 2.92 | 2.92 | 2.92 |
| | | Magnesium Chloride (hexahydrate) | | 0.46 | 0.46 | 0.46 |
| | | Magnesium Chloride (in terms of anhydride) | | 0.22 | 0.22 | 0.22 |
| | After Drying (wt %) | Sodium Chloride | 4.42 | 4.42 | 4.42 | 4.42 |
| | | Magnesium Chloride (in terms of anhydride) | | 0.33 | 0.33 | 0.33 |

(Salty Taste and Bitter Taste)

The salty taste and the bitter taste of instant noodles obtained after reconstitution with hot water were measured using a taste sensor. Besides, in order to confirm the relevance between a salty taste and electrical conductivity, the electrical conductivity was also measured. The measurement was performed under the following conditions:

(1) Noodles were crushed with a hammer.

(2) 5 g of the crushed noodles was weighed and put in a 50 mL centrifuge tube.

(3) 30 g of hot water was added into the centrifuge tube, and the resultant was stirred using a vortex mixer and then allowed to stand still for 3 minutes.

(4) The resultant was subjected to centrifugation (12,000 rpm, 5 min) to separate a supernatant 1.

(5) 20 g of hot water was added to the thus obtained precipitate, and the resultant was stirred using a vortex mixer for 3 minutes.

(6) The resultant was subjected to centrifugation (12,000 rpm, 5 min) to separate a supernatant 2.

(7) 20 g of hot water was added again to the thus obtained precipitate, and the resultant was stirred using a vortex mixer for 3 minutes.

(8) The resultant was subjected to centrifugation (12,000 rpm, 5 min) to separate a supernatant 3.

(9) The supernatants 1 to 3 were together transferred to a measuring flask, and the resultant was diluted to 50 ml to prepare a measurement sample.

(10) An electrical conductivity meter "LAQUA twin COND B-771 (manufactured by HORIBA Ltd.)" was used to measure the electrical conductivity of the measurement sample.

(11) A taste sensor "TS-5000Z (manufactured by Intelligent Sensor Technology, Inc.)" was used to measure a salty taste and a bitter taste of the measurement sample.

The measurement results of the salty taste and the electrical conductivity are shown in Table 4. In Table 4, the salty taste found using the taste sensor was shown as "Salty Taste Score", and the bitter taste was shown as "Bitter Taste Score".

(Texture (Elasticity))

The texture of the instant noodles was evaluated by ten expert panelists on the basis of the following criteria. The term "texture" herein refers to "elasticity" attained owing to the elasticity of noodles.

good: Nine or more panelists evaluated that "the texture was equivalent to or better than that of the standard (Comparative Example 1)".

bad: Eight or less panelists evaluated that "the texture was equivalent to or better than that of the standard".

Example 201 in which magnesium chloride was applied in the flavoring step had a high salty taste score (also the electrical conductivity was high), and was excellent also in the texture. On the other hand, when magnesium chloride was added before producing the noodle strings (Comparative Examples 202 and 203), the salty taste was weak, and the texture was obviously poor. Besides, although the detailed mechanism is not clear, the bitter taste was suppressed in Example 201 as compared with that in Comparative Examples 202 and 203.

When the amount of magnesium chloride contained in the liquid seasoning was changed to 10 parts or 40 parts, the salty taste score (as well as the electrical conductivity) and the bitter taste score were increased as the increase of the amount of magnesium chloride, and the texture was equivalent to that of Example 201.

Section 3

Comparative Example 301

900 g of wheat flour and 100 parts of acetylated tapioca starch were powder mixed, and to the resultant powder, kneading water containing 345 parts of water, 15 parts of sodium chloride and 3 parts of kansui (potassium carbonate: sodium carbonate=3:2) was added, and the resultant was mixed using a batch mixer for 15 minutes to produce noodle dough.

Next, a roll was used to compound and roll out the dough to produce a noodle belt with a thickness of 0.9 mm, and the noodle belt was cut with a cutting blade roll (round blade No. 20, groove width: 1.5 mm) to obtain noodle strings (cut noodles). The noodle strings were steamed with saturated steam of 270 kg/h for 2 minutes to produce gelatinized noodle strings 301.

The gelatinized noodle strings 301 were dipped in a liquid seasoning (1 litter) containing water and 90 parts of sodium chloride for 20 seconds, the resultant was cut into a length of about 30 cm (100 g), and filled in a retainer. The noodle strings in the retainer was dried in palm oil at 150° C. for 2 minutes and 30 seconds (by the instantaneous hot oil drying method) to produce instant noodles 301 (Comparative Example 301) having a moisture content of 2% by weight. The weight of the noodle strings filled in the retainer was 100 g, and the weight of the instant noodles 301 after drying was 66 g.

Example 301

The gelatinized noodle strings 301 were dipped in a liquid seasoning (1000 ml) containing water, 70 parts of sodium chloride, 20 parts of magnesium chloride hexahydrate and 5 parts of potassium lactate (purity: 78%) for 20 seconds, and dried under the same conditions as in Comparative Example 301 to produce instant noodles 311 (Example 301) having a moisture content of 2% by weight.

TABLE 4

| | | Comparative Example 201 Standard | Example 201 | Comparative Example 202 | Comparative Example 203 |
|---|---|---|---|---|---|
| After Drying (wt %) | Sodium Chloride | 4.42 | 4.42 | 4.42 | 4.42 |
| | Magnesium Chloride (in terms of anhydride) | | 0.33 | 0.33 | 0.33 |
| Evaluation | Salty Taste | Electrical Conductivity (ms/cm) | 3.5 | 3.9 | 3 | 3.1 |
| | | Salty Taste Score | 1.42 | 2.13 | 0.67 | 0.84 |
| | Bitter Taste | Bitter Taste Score | 8.72 | 9.02 | 10.65 | 10.32 |
| | | Texture | good | good | bad | bad |

Examples 302 to 322 and Comparative Examples 302 to 306

Instant noodles 302 to 306 (Comparative Examples 302 to 306) and instant noodles 312 to 332 (Examples 302 to 322) were obtained with the liquid seasoning changed as shown in Tables 5 to 7. The concentrations of magnesium chloride, potassium lactate and sodium chloride in the respective instant noodles are shown in Tables 5 to 7.

TABLE 5

| | | | Comparative Example | | | | | |
|---|---|---|---|---|---|---|---|---|
| | | | 301 Standard/ Positive Instant Noodles 301 | 302 Salty Standard/ Negative Instant Noodles 302 | 303 Acidic Standard/ Negative Instant Noodles 303 | 304 Instant Noodles 304 | 305 Bitter Standard/ Negative Instant Noodles 305 | 306 Instant Noodles 306 |
| Noodle Strings (parts) | Dough | Wheat Flour | 900 | 900 | 900 | 900 | 900 | 900 |
| | | Acetylated Tapioca Starch | 100 | 100 | 100 | 100 | 100 | 100 |
| | Kneading Water | Water | 345 | 345 | 345 | 345 | 345 | 345 |
| | | Sodium Chloride | 15 | 15 | 15 | 15 | 15 | 15 |
| | | Kansui | 3 | 3 | 3 | 3 | 3 | 3 |
| Liquid Seasoning (parts) | | Sodium Chloride | 90 | 50 | 50 | 50 | 50 | 50 |
| | | Potassium Lactate (78%) | | | 40 | 60 | | |
| | | Magnesium Chloride (hexahydrate) | | | | | 40 | 60 |
| Before Drying (wt %) | | Magnesium Chloride (in terms of anhydride) | 0.00 | 0.00 | 0.00 | 0.00 | 0.43 | 0.65 |
| | | Potassium Lactate (in 100%) | 0.00 | 0.00 | 0.72 | 1.08 | 0.00 | 0.00 |
| After Drying (wt %) | | Magnesium Chloride (in terms of anhydride) | 0.00 | 0.00 | 0.00 | 0.00 | 0.65 | 0.98 |
| | | Potassium Lactate (in 100%) | 0.00 | 0.00 | 1.09 | 1.63 | 0.00 | 0.00 |
| | | Sodium Chloride | 2.85 | 1.93 | 1.93 | 1.93 | 1.93 | 1.93 |
| Ratio | | Sodium Chloride/Salty Taste Component | 1.00 | 1.00 | 0.64 | 0.54 | 0.75 | 0.66 |
| Evaluation | | Salty Taste | good | bad | bad | fair | fair | good |
| | | Bitter Taste | good | good | fair | bad | bad | bad |
| | | Acidic Taste | good | good | bad | bad | good | good |

TABLE 6

| | | | Example | | | | | | | | | | |
|---|---|---|---|---|---|---|---|---|---|---|---|---|---|
| | | | 301 Instant Noodles 311 | 302 Instant Noodles 312 | 303 Instant Noodles 313 | 304 Instant Noodles 314 | 305 Instant Noodles 315 | 306 Instant Noodles 316 | 307 Instant Noodles 317 | 308 Instant Noodles 318 | 309 Instant Noodles 319 | 310 Instant Noodles 320 | 311 Instant Noodles 321 |
| Noodle Strings (parts) | Dough | Wheat Flour | 900 | 900 | 900 | 900 | 900 | 900 | 900 | 900 | 900 | 900 | 900 |
| | | Acetylated Tapioca Starch | 100 | 100 | 100 | 100 | 100 | 100 | 100 | 100 | 100 | 100 | 100 |
| | Kneading Water | Water | 345 | 345 | 345 | 345 | 345 | 345 | 345 | 345 | 345 | 345 | 345 |
| | | Sodium Chloride | 15 | 15 | 15 | 15 | 15 | 15 | 15 | 15 | 15 | 15 | 15 |
| | | Kansui | 3 | 3 | 3 | 3 | 3 | 3 | 3 | 3 | 3 | 3 | 3 |
| Liquid Seasoning (parts) | | Sodium Chloride | 70 | 70 | 70 | 70 | 70 | 70 | 70 | 70 | 70 | 70 | 70 |
| | | Potassium Lactate (78%) | 5 | 10 | 20 | 40 | 60 | 90 | 20 | 20 | 20 | 20 | 20 |
| | | Magnesium Chloride (hexahydrate) | 20 | 20 | 20 | 20 | 20 | 20 | 5 | 10 | 40 | 60 | 90 |
| Before Drying (wt %) | | Magnesium Chloride (in terms of anhydride) | 0.22 | 0.22 | 0.22 | 0.22 | 0.22 | 0.22 | 0.05 | 0.11 | 0.43 | 0.65 | 0.97 |
| | | Potassium Lactate (in 100%) | 0.09 | 0.18 | 0.36 | 0.72 | 1.08 | 1.61 | 0.36 | 0.36 | 0.36 | 0.36 | 0.36 |
| After Drying (wt %) | | Magnesium Chloride (in terms of anhydride) | 0.33 | 0.33 | 0.33 | 0.33 | 0.33 | 0.33 | 0.08 | 0.16 | 0.65 | 0.98 | 1.47 |
| | | Potassium Lactate (in 100%) | 0.14 | 0.27 | 0.54 | 1.09 | 1.63 | 2.45 | 0.54 | 0.54 | 0.54 | 0.54 | 0.54 |
| | | Sodium Chloride | 2.39 | 2.39 | 2.39 | 2.39 | 2.39 | 2.39 | 2.39 | 2.39 | 2.39 | 2.39 | 2.39 |
| Ratio | | Sodium Chloride/ Salty Taste Component | 0.84 | 0.80 | 0.73 | 0.63 | 0.55 | 0.46 | 0.79 | 0.77 | 0.67 | 0.61 | 0.54 |
| Evaluation | | Salty Taste | fair | good | good | good | good | good | fair | good | good | good | good |
| | | Bitter Taste | good | good | good | good | fair | bad | good | good | good | fair | bad |
| | | Acidic Taste | good | good | good | good | fair | bad | good | good | good | good | good |

TABLE 7

| | | Example | | | | | | | | | | |
|---|---|---|---|---|---|---|---|---|---|---|---|---|
| | | 312 Instant Noodles 322 | 313 Instant Noodles 323 | 314 Instant Noodles 324 | 315 Instant Noodles 325 | 316 Instant Noodles 326 | 317 Instant Noodles 327 | 318 Instant Noodles 328 | 319 Instant Noodles 329 | 320 Instant Noodles 330 | 321 Instant Noodles 331 | 322 Instant Noodles 332 |
| Noodle Strings (parts) | Dough | Wheat Flour | 900 | 900 | 900 | 900 | 900 | 900 | 900 | 900 | 900 | 900 | 900 |
| | | Acetylated Tapioca Starch | 100 | 100 | 100 | 100 | 100 | 100 | 100 | 100 | 100 | 100 | 100 |
| | Kneading Water | Water | 345 | 345 | 345 | 345 | 345 | 345 | 345 | 345 | 345 | 345 | 345 |
| | | Sodium Chloride | 15 | 15 | 15 | 15 | 15 | 15 | 15 | 15 | 15 | 15 | 15 |
| | | Kansui | 3 | 3 | 3 | 3 | 3 | 3 | 3 | 3 | 3 | 3 | 3 |
| Liquid Seasoning (parts) | | Sodium Chloride | 50 | 50 | 50 | 50 | 50 | 50 | 50 | 50 | 50 | 50 | 50 |
| | | Potassium Lactate (78%) | 5 | 10 | 20 | 40 | 60 | 90 | 40 | 40 | 40 | 40 | 40 |
| | | Magnesium Chloride (hexahydrate) | 40 | 40 | 40 | 40 | 40 | 40 | 5 | 10 | 20 | 60 | 90 |
| Before Drying (wt %) | | Magnesium Chloride (in terms of anhydride) | 0.43 | 0.43 | 0.43 | 0.43 | 0.43 | 0.43 | 0.05 | 0.11 | 0.22 | 0.65 | 0.97 |
| | | Potassium Lactate (in 100%) | 0.09 | 0.18 | 0.36 | 0.72 | 1.08 | 1.61 | 0.72 | 0.72 | 0.72 | 0.72 | 0.72 |
| After Drying (wt %) | | Magnesium Chloride (in terms of anhydride) | 0.65 | 0.65 | 0.65 | 0.65 | 0.65 | 0.65 | 0.08 | 0.16 | 0.33 | 0.98 | 1.47 |
| | | Potassium Lactate (in 100%) | 0.14 | 0.27 | 0.54 | 1.09 | 1.63 | 2.45 | 1.09 | 1.09 | 1.09 | 1.09 | 1.09 |
| | | Sodium Chloride | 1.93 | 1.93 | 1.93 | 1.93 | 1.93 | 1.93 | 1.93 | 1.93 | 1.93 | 1.93 | 1.93 |
| Ratio | | Sodium Chloride/ Salty Taste Component | 0.71 | 0.68 | 0.62 | 0.53 | 0.46 | 0.38 | 0.62 | 0.61 | 0.58 | 0.48 | 0.43 |
| Evaluation | | Salty Taste | fair | fair | good | good | good | good | fair | fair | good | good | good |
| | | Bitter Taste | fair | good | good | good | fair | bad | good | good | good | fair | bad |
| | | Acidic Taste | good | good | good | good | fair | bad | good | good | good | good | good |

(Evaluation Criteria)

The instant noodles (66 g) of each of the examples and comparative examples was reconstituted by pouring 300 ml of hot water thereonto and allowing the resultant to stand still for 3 minutes with a lid put thereon. The reconstituted noodles were loosened with chopsticks, and then, the hot water was sufficiently drained. Thereafter, sensory evaluation tests for a salty taste, a bitter taste and an acidic taste were performed by ten panelists.

(Salty Taste)

The salty taste was evaluated based on a positive control (Comparative Example 301) and a negative control (Comparative Example 302) as follows:

bad: Nine or more panelists evaluated that the salty taste was equivalent to or weaker than that of Comparative Example 302.

good: Nine or more panelists evaluated that the salty taste was equivalent to or stronger than that of Comparative Example 301.

fair: The other evaluation (intermediate evaluation between "good" and "bad").

(Acidic Taste)

The acidic taste was evaluated based on a positive control (Comparative Example 301) and a negative control (Comparative Example 303) as follows:

bad: Nine or more panelists evaluated that the acidic taste was equivalent to or stronger (worse) than that of Comparative Example 303.

good: Nine or more panelists evaluated that the acidic taste was equivalent to that of Comparative Example 301 or that no acidic taste was felt.

fair: The other evaluation (intermediate evaluation between "good" and "bad").

(Bitter Taste)

The bitter taste was evaluated based on a positive control (Comparative Example 301) and a negative control (Comparative Example 305) as follows:

bad: Nine or more panelists evaluated that the bitter taste was equivalent to or stronger (worse) than that of Comparative Example 305.

good: Nine or more panelists evaluated that the salty taste was equivalent to that of Comparative Example 301, or that no bitter taste was felt.

fair: The other evaluation (intermediate evaluation between "good" and "bad").

(Conclusion of Evaluation)

Although there is a tendency that increase of the amount of potassium lactate added enhances an acidic taste, the acidic taste is suppressed when magnesium chloride is used together (see Comparative Examples 301, 303 and 304 and Examples 301 to 306 and 312 to 317). Besides, when the amount of potassium lactate added is small, the evaluation of a salty taste and a bitter taste tends to be low, but the evaluation of a salty taste and a bitter taste is improved by adding a proper amount of potassium lactate (Examples 301 to 303 and 312 to 314).

On the other hand, although there is a tendency that increase of the amount of magnesium chloride added enhances a bitter taste, the bitter taste is suppressed when sodium lactate is used together (Comparative Examples 301, 305 and 306, and Examples 307 to 311 and 318 to 322).

The invention claimed is:

1. Instant noodles comprising:
magnesium chloride, potassium lactate, sodium chloride, and a raw material powder,
wherein a content of the magnesium chloride is in a range from 0.05 to 1.50% by weight and a content of the potassium lactate is in a range from 0.10 to 2.50% by weight in a total amount of the instant noodles, and
wherein a weight ratio of sodium chloride in a salty taste component is in a range from 0.55 to 0.80, wherein the salty taste component consists essentially of magnesium chloride, potassium lactate and sodium chloride of the instant noodles.

2. The instant noodles according to claim 1, wherein the content of the magnesium chloride is in a range from 0.10 to 0.70% by weight in the total amount of the instant noodles.

3. The instant noodles according to claim 1, wherein the content of the potassium lactate is in a range from 0.20 to 1.50% by weight in the total amount of the instant noodles.

* * * * *